United States Patent [19]

Walter

[11] Patent Number: 4,505,294

[45] Date of Patent: Mar. 19, 1985

[54] SLURRY VALVE

[75] Inventor: John F. Walter, Warwick, R.I.

[73] Assignee: Crosby Valve & Gage Company, Wrentham, Mass.

[21] Appl. No.: 537,543

[22] Filed: Sep. 30, 1983

Related U.S. Application Data

[63] Continuation of Ser. No. 377,686, May 12, 1982, abandoned, which is a continuation of Ser. No. 169,915, Jul. 17, 1980, abandoned.

[51] Int. Cl.³ ............................................. F16K 3/36
[52] U.S. Cl. .................................... 137/241; 137/240; 251/174; 251/315
[58] Field of Search ............... 137/241, 240; 251/174, 251/315

[56] References Cited

U.S. PATENT DOCUMENTS

| | | | |
|---|---|---|---|
| 2,466,098 | 4/1949 | Grebmeier | 251/174 |
| 2,764,995 | 10/1956 | Krupp | 137/241 |
| 2,834,613 | 5/1958 | Snyder | 251/174 X |
| 3,135,285 | 6/1964 | Volpin | 251/174 X |
| 3,220,694 | 11/1965 | Eschbaugh | 251/174 |
| 3,346,234 | 10/1967 | Allen | 251/174 |
| 3,385,313 | 5/1968 | Okada | 251/174 X |
| 3,678,956 | 7/1972 | Ebin | 251/174 X |
| 3,891,183 | 6/1975 | Feiring | 251/174 X |
| 4,084,608 | 4/1978 | Laignel | 251/174 X |
| 4,151,855 | 5/1979 | Levin | 251/174 X |

Primary Examiner—Harold W. Weakley
Attorney, Agent, or Firm—Pearne, Gordon, Sessions, McCoy, Granger & Tilberry

[57] ABSTRACT

A ball valve is provided to transmit high density substances such as fluids which are free flowing at elevated temperatures but which are viscous, semi-solid or solid at ambient temperatures. Such substances tend to clog standard ball valves over relatively short periods of operation whereas the subject ball valve provides means to deter clogging comprising a flow diverter sleeve which prevents substances from penetrating and congealing about internal valve parts.

4 Claims, 4 Drawing Figures

SLURRY VALVE

This is a continuation of application Ser. No. 377,686, filed May 12, 1982, which is a continuation of application Ser. No. 169,915, filed July 17, 1980, all now abandoned.

BACKGROUND OF THE INVENTION

This invention relates to valves and, more particularly, to ball valves for use in processing high density substances. Specifically, this invention relates to ball valves for use in the transmission of high density substances which are fluid and free flowing at elevated temperatures but which are viscous, semi-solid or solid at ambient temperatures. For example, in the coal industry, powdered coal may be processed in either a gaseous or liquid environment. By a process called liquefaction, coal is chemically polymerized whereby hydrogen is molecularly bonded to carbon to form a hydrocarbon. The resultant hydrocarbon can then be further processed similar to natural occurring hydrocarbons such as crude oil. Gasification and liquefaction of coal take place at both high temperatures and pressures during which time the fluids must be transported and metered from one pressure vessel to another. Such transportation and metering is controlled by ball valves. In view of the high pressures and temperatures at which these fluids are transported, they tend to penetrate into the inner portions of standard ball valves. After cooling solidification takes place with consequent congealing about the internal ball valve parts, rendering them inoperable.

This invention has been called a slurry valve and, as used in the context of the following description, slurry is defined to mean all high density fluid substances which must be passed through and/or controlled by valve means.

It is therefore the object of this invention to provide an improved slurry valve adapted to receive and transmit high density substances at elevated temperatures and pressures in which penetration of the internal portion of the ball valve by said substances is appreciably inhibited.

It is another object of this invention to provide a slurry valve with flow diverter means to prevent fluid substances from penetrating and congealing about internal valve parts.

It is yet another object of this invention to provide a ball valve which has the advantages of a standard ball valve but is without its disadvantages when used to handle slurries at high temperatures and pressures.

It is still another object of this invention to provide a slurry valve which is competitive in price with standard ball valves and yet provides longer trouble free life during transmission of high density substances at elevated temperatures and pressures.

It is still yet another object of this invention to provide a ball valve for transmitting high density substances at elevated temperatures and pressures having means which are simple, inexpensive and trouble free for preventing penetration and hardening of the transmitted substance about internal valve parts and which may be easily and inexpensively reconditioned after long periods of service.

Other objects of this invention will become apparent to those skilled in the art upon a reading and study of the following specification, drawings and claims.

The invention accordingly comprises the constructions hereinafter described, the scope of the invention being indicated in the appended claims.

In the accompanying drawings, in which several embodiments of the invention are illustrated:

HISTORY OF THE INVENTION

Applicant's assignee contracted to provide ball valves for solids withdrawal service in a coal liquefaction pilot plant. Two of assignee's one-half inch nominal size ball valves were placed in service in this pilot plant, the first of which was a ball valve of standard design such a shown in FIG. 1 of the drawings. This valve consisted of a 316 stainless steel body, bonnet, spool seat and spring retainer. The one piece ball and stem was made from 440C stainless steel. The seat surface was hard faced with Stellite #6. Haselloy C springs, Chesterton No. 1500 packing and Stellite #6 bushings were also used. A 316 stainless steel tail piece was welded to the valve body.

Figure 2:
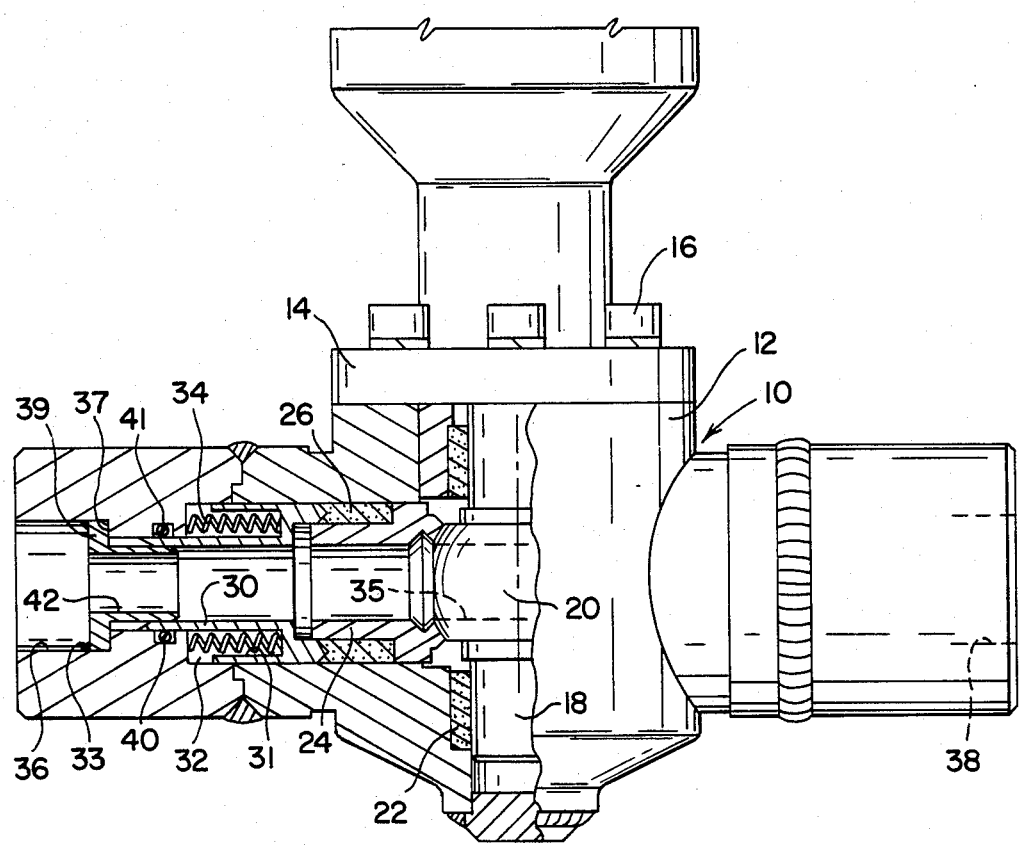
FIG. 2 is a side elevation in partial section illustrating means to modify the prior art slurry valve of FIG. 1 to embody the subject invention.
Figure 3:
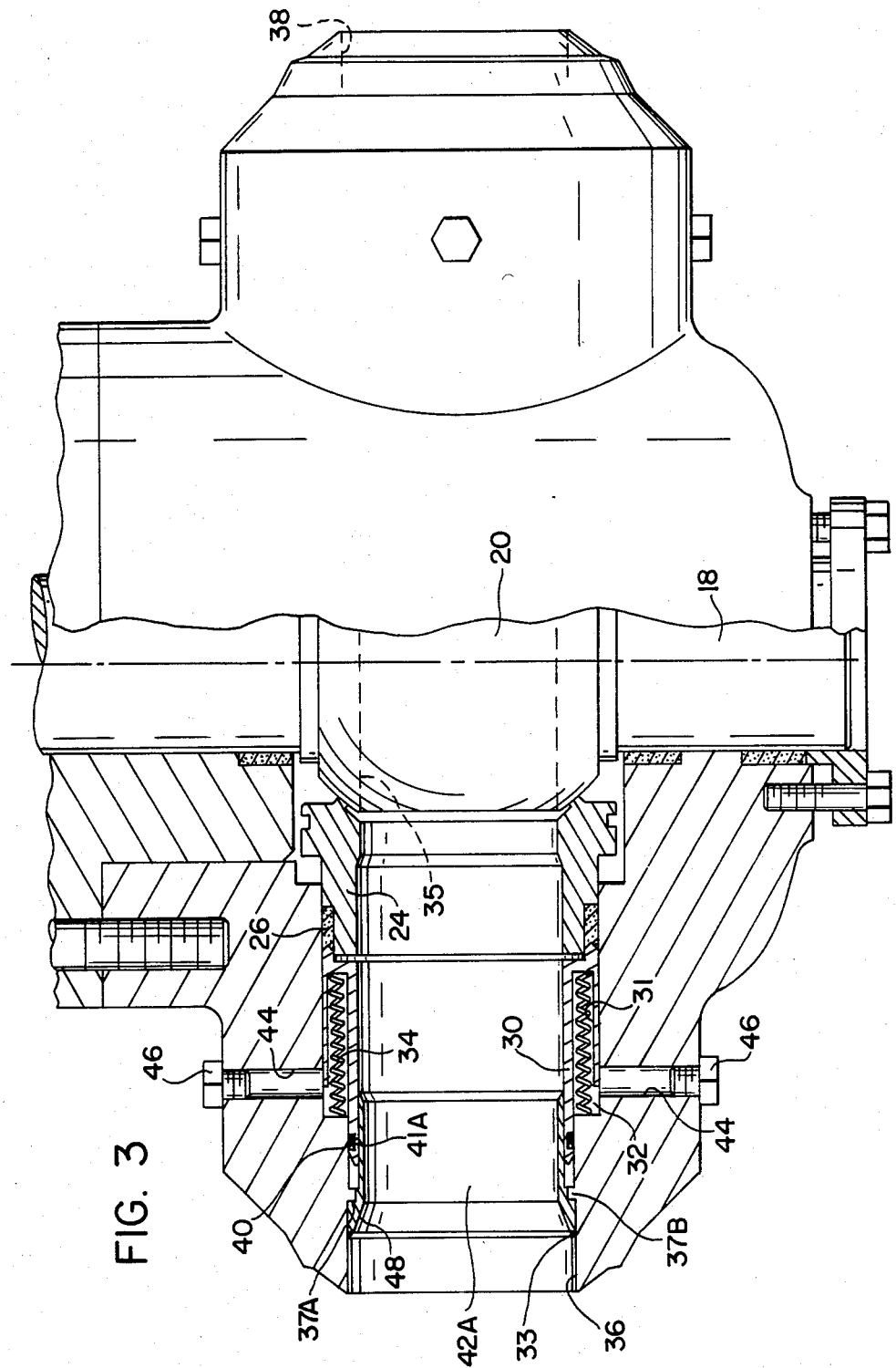
FIG. 3 is a side elevation in partial section illustrating a preferred embodiment of the invention; and, FIG. 4 is an enlarged full sectional view of a modified embodiment of the inlet portion of the valve shown in FIG. 3.
Figure 4:
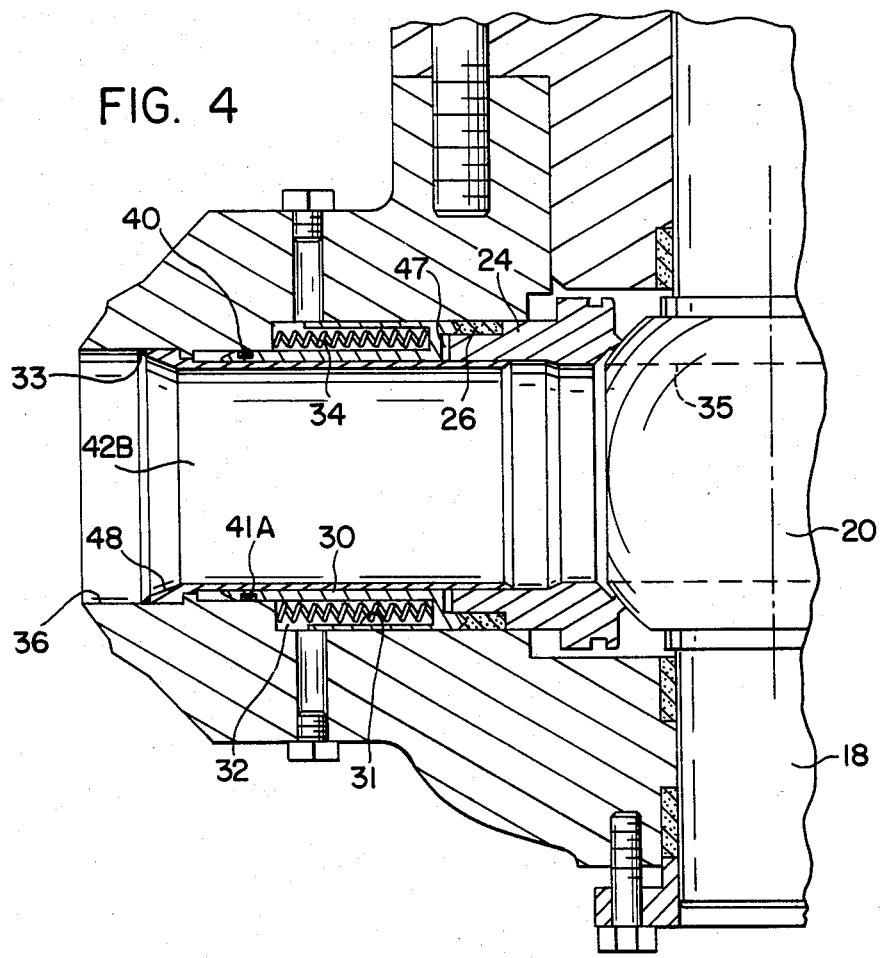

The other ball valve, shown in FIG. 2, employed many of the standard parts used in the first valve but it was modified to include the inventive features hereinafter described and claimed. As shown in FIGS. 2, 3 and 4, this ball valve is redesigned to protect the valve internal parts from a build-up of solids.

The coal slurry in the liquefaction reactor was produced from Illinois #6 Bitiminous coal, varrying between 25% and 75% solid material.

The valves were used to draw down and to remove heavy solids from the coal liquefaction reactor. During this test, the valves were operated at intervals ranging from one-half hour to four hours, with up to ten open and close cycles at each interval. The valves were maintained at temperatures of 325° F. to 375° F. by means of electric heating tapes and the coal product in the accumulator was at 1,000° F. The pressure across the valves was 40 to 50 pounds per square inch, but this pressure would occasionally go over 100 pounds per square inch. Both valves were cycled open to close for over 1,000 cycles under the above conditions. Both valves were then removed from the system, hydrostatically tested, disassembled and inspected.

The redesigned valve passed the hydrostatic test. The standard valve failed this test. Disassembly of the standard ball valve revealed considerable build-up of solids in the springs, spool seat and bonnet areas. Due to this accumulation of solid material in the standard ball valve, the ball, spool seats, and other valve internals could not be removed with the normal disassembly tools. Normal procedure requires that the spool seat be pulled back, and the spring compressed, and held back to enable the ball to be removed. The accumulation of solids prevented the spool from being pulled back and the ball was finally removed by turning the valve upside down and driving the ball out by means which damaged the seats of the valve.

Disassembly of the redesigned ball valve, the subject of this application, proceeded without difficulty in normal fashion, using the standard procedures and tools. The valve internals were found to be much cleaner, i.e. much less build-up of solids in the springs, spool seat and bonnet areas. Particular attention was given to the springs and spring retainer which were found to be relatively free from solid build-up, thus allowing the springs to compress and recover as intended. Visual examination and bluing of the ball seat surfaces showed good mating surfaces. These critical surfaces were neither abraded nor scored, as were the ball seat surfaces of the standard ball valve.

THE PRIOR ART

Figure 1:
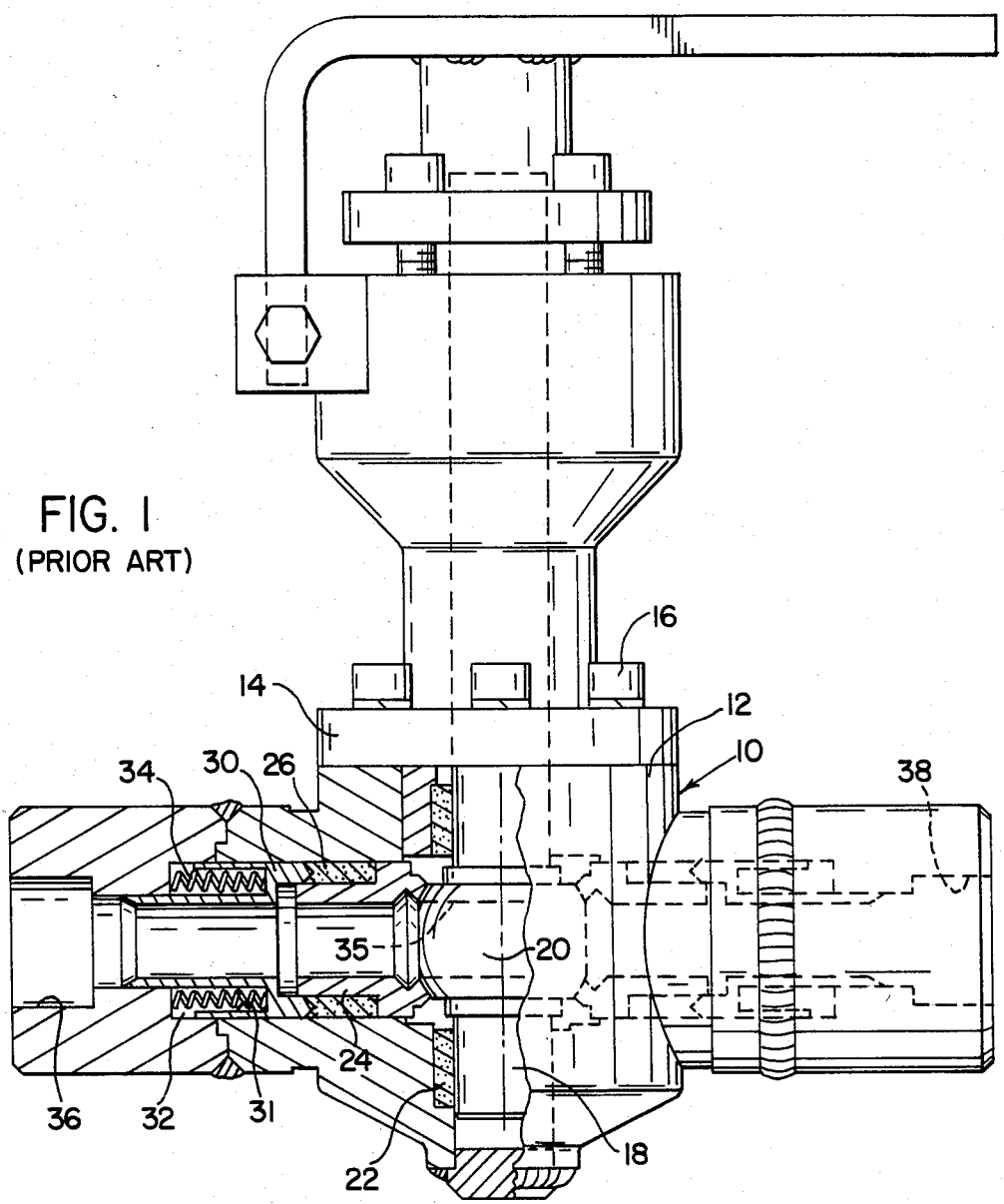
FIG. 1 is a side elevation view in partial section illustrating a prior art slurry valve.

Reference is now made to FIG. 1, wherein is shown the prior art ball valve which was installed for testing in a coal slurry liquefaction pilot plant. The valve comprises a valve body assembly 10, a bonnet 12, and a bonnet cap 14 held to the body assembly by bonnet cap screws 16. Internal of the body assembly is a ball stem 18 journaled in the body assembly 10 to position a ball 20 midway between the body assembly inlet 36 and outlet 38. Ball stem 18 is provided with stem packing 22 to prevent leaking along the ball stem 18 occurring between spool seat 24 and ball 20. Spool packing 26 is provided between the body assembly 10 and the spool seat 24 to prevent leaking into the spring retainer chamber 32 and spring means 34. Spring retainer 30, schematically shown, is a cylindrical member having a plurality of peripherally arranged individual spring retainer holes 31 formed between its inner and outer wall surfaces to house a plurality of springs 34 therein. The passageway 35 through the ball 20 is axially alignable with valve body inlet 36 and outlet 38.

In operation, a fluid is admitted into inlet 36 to pass through ball passageway 35 and to exit from ball valve outlet 38. Under pilot plant operating pressures and temperatures, the fluid also gained entrance into the spring retainer chamber 32 and between the spool seat 24 and ball 20. Thereafter, upon cooling, this trapped fluid solidifies and cakes about the internal valve parts with the deleterious results just described.

THE INVENTION

Referring to FIG. 2, therein is shown a ball valve of basically the same structure as that shown in the prior art FIG. 1, and wherein like parts are identified with like numerals. However, in addition to the structure of FIG. 1, a directional flow sleeve 42 has been adapted to telescopically fit within the upstream portion of the spring retainer 30 and flow sleeve collar 39 makes abutting contact with surface 37 of valve body 10. With this arrangement of parts, the directional flow sleeve 42 is positively located within the valve body A and is prevented from moving downstream under the pressure of the fluid being admitted at the ball valve inlet 36. To prevent leaking between the directional flow sleeve collar 39 and the valve inlet 36, the collar may either be press fit within the inlet or welded about the periphery of the collar as shown at 33. A spring retainer packing 30, which may be an O-ring, is provided in a groove 41 machined into valve body 10 to provide sealing contact between valve body 10 and spring retainer 30.

With the directional flow sleeve 42 in place, as shown in FIG. 2, for the fluid entering the ball valve to penetrate into the spring retainer chamber 32 an abrupt change of direction would be required of the fluid. However, in view of the momentum of the fluid passing through the ball valve this cannot occur, and accordingly the spring retainer chamber is maintained substantially free of foreign substances which could deactivate the spring. Thus, the fluid passes through the ball valve without penetrating the internal portions of the valve causing the problems above described.

Referring to FIG. 3, therein is shown a modified version of the subject ball valve wherein abutting surface 37A is formed on land 37B and the upstream portion of the spring retainer is provided with a packing groove 41A in lieu of the packing groove 41 in the body of the valve as shown in FIG. 2. Additionally, cleanout ports 44 are provided about the periphery of the inlet portion of the valve body which are normally maintained sealed with cap screws 46. By removing the cap screws, the spring retainer chambers 32 may be cleaned such as by application of steam, solvents or the like.

Referring to FIG. 4, yet another embodiment of the invention is shown wherein the directional flow sleeve 42B is extended downstream beyond the interface 47 between the spring retainer 30 and the spool seat 24 so as to minimize the possibility of any penetration of the fluid between this interface.

It will be observed that the upstream portion of the directional flow sleeves shown in FIGS. 3 and 4 respectively, have been streamlined at champfered entrances 48 to reduce turbulence at this portion of the valve body inlet. With reduced turbulence, the possibility of penetration of fluid into the internal portions of the valve is even further reduced.

It is intended that this valve be used and have utility not only in all applications of slurry transportation but also in the actual burning or oxidization of coal whether in the liquid or gaseous state. However, it should be noted that the invention is intended to prevent solids build-up within the valve while in the open position only. The means to mitigate penetration of fluid into the internal portions of the valve caused by static pressure when the valve is closed is not embraced by the subject invention.

The present disclosure includes that which is contained in the appended claims as well as the foregoing description. Although this invention has been described in its preferred forms with a certain degree of particularity, it is understood that the present disclosure of the preferred forms have been made only by way of example and that numerous changes in the details of construction and a combination and arrangement of parts may be resorted to without departing from the spirit and scope of the invention as hereinafter claimed.

Having thus described the invention, it is claimed:

1. In a valve having a valve body; a valve ball chamber in said body, a valve ball rotatably journaled therein; a spool seat adapted to making sealing engagement with said ball valve; spring means; a spring retainer in axial abutment with said spool seat and adapted to position said spring means in axial compression between said valve body and said spring retainer to urge said spool seat into pressure contact with said valve ball, said spring retainer having an annular skirt extending upstream to fit concentrically within said body, the improvement in means to adapt said valve for use in processing high density substances flowable under high pressures and at elevated temperatures but nonflowable at ambient temperatures, comprising: a flow diverter sleeve adapted to fit concentrically within said spring retainer skirt; a collar on the upstream end of said sleeve, an interior annular shoulder formed in said body downstream from said collar and adapted and located to receive said collar in abutting contact therewith; means to seal the upstream portion of the periphery of said collar with the interior of said body; and means to seal the periphery of said skirt with the interior of said body, whereby flowable substances being processed through said valve are diverted past the upstream edge of said skirt to minimize seepage into and contamination and clogging of said spring means, spring retainer and valve ball chamber.

2. The valve set forth in claim 1, including means to clean said spring means and said spring retainer of said contaminating substances.

3. The valve set forth in claim 1, including clean out ports radially positioned about the periphery of said valve body and in direct communication with said spring retainer to remove said contaminating substances therefrom.

4. The valve set forth in claim 1, wherein said flow diverter sleeve extends downstream for concentric reception within the upstream end of said spool seat.

* * * * *